United States Patent [19]

Takimoto

[11] Patent Number: 5,032,911

[45] Date of Patent: Jul. 16, 1991

[54] VIDEO IMAGE PRINTER USING LIQUID CRYSTAL LIGHT VALVES AND PRIMARY AUXILIARY DIRECTION SCANNING

[75] Inventor: Masaaki Takimoto, Tokyo, Japan

[73] Assignee: Fuji Photo Film Co., Ltd., Kanagawa, Japan

[21] Appl. No.: 514,802

[22] Filed: Apr. 26, 1990

[30] Foreign Application Priority Data

Apr. 28, 1989 [JP] Japan .................................. 1-110065

[51] Int. Cl.$^5$ ........................... G03F 3/10; H04N 1/23
[52] U.S. Cl. ........................................ 358/76; 358/302
[58] Field of Search ........................ 358/75, 76, 302; 355/27, 38, 71; 354/85, 86; 350/331 R

[56] References Cited

U.S. PATENT DOCUMENTS

| | | | |
|---|---|---|---|
| 4,595,259 | 6/1986 | Perregaux | 350/331 R |
| 4,605,972 | 8/1986 | Hatanaka | 358/302 |
| 4,712,878 | 12/1987 | Taniguchi et al. | 350/331 R |
| 4,745,433 | 5/1988 | Fujimura et al. | 350/331 R |
| 4,839,676 | 6/1989 | Lippert et al. | 354/86 |
| 4,859,034 | 8/1989 | Shiraishi et al. | 350/331 R |

*Primary Examiner*—Howard W. Britton
*Assistant Examiner*—Kim Yen Vu
*Attorney, Agent, or Firm*—Sughrue, Mion, Zinn, Macpeak & Seas

[57] ABSTRACT

A video image printer is coupled to a video signal source such as a video camera, an electronic still camera, a video tape recorder, a television receiver, or the like, for producing a hard copy bearing a recorded image which is displayed by on a monitor display. The video image printer includes a liquid crystal light valve with a liquid crystal orientation thereof variable depending on an applied video signal, color filters mounted on one end of the liquid crystal light valve, and a light source optically coupled to the one end of the liquid crystal light valve. A photographic film is disposed on the side of an opposite end of the liquid crystal light valve, the film carrying a self-processing solution. The film is selectively exposed to an image that is formed by light from the light source through the color filter means and the liquid crystal light valve controlled by the applied video signal. The video image printer also includes a pair of squeezing rollers for spreading the processing solution over the film which has been exposed.

14 Claims, 9 Drawing Sheets

VIDEO IMAGE PRINTER USING LIQUID CRYSTAL LIGHT VALVES AND PRIMARY AUXILIARY DIRECTION SCANNING

BACKGROUND OF THE INVENTION

The present invention relates to a video image printer for reproducing an image on a photosensitive medium based on a video signal, and more particularly to a video image printer for driving a liquid crystal light valve based on image information borne by a video signal, to allow light to be transmitted through the light valve for exposure of a photosensitive medium to reproduce an image thereon.

There has been a growing demand for video image printers which produce hard copies bearing reproduced images that have been displayed on monitor displays. Such video image printers are used in various applications. For example, a video image printer may be used in video shops or the like which provide a quick printout service. Medical organizations may find video image printouts useful as a diagnostic aid or for data storage. Video image printers may find home use for obtaining photoprints of desired displayed video images. It is desired that printouts or hard copies thus produced be of high image quality.

One known recording method employed by video image printers is a thermal recording process in which an image is printed on a heat-sensitive recording medium directly by a thermal head. However, the thermal recording process is disadvantageous in that the heat-sensitive recording medium is easily degraded and hence cannot be preserved over a long period of time, and it can record images in only two colors, i.e., black and white.

The above problems can be solved by a thermal image transfer recording process. According to this process, a recording medium is in the form of a plain sheet of paper, and a type ribbon composed of strips of magenta, cyan, and yellow is positioned adjacent to the recording medium. The colors that are carried by the type ribbon are thermally transferred to the recording medium by a thermal head. The thermal image transfer recording process is however employed in reproducing only a colored image of line art because the process is unable to reproduce continuous tone images due to difficulty in controlling the amount of coloring materials to be transferred.

Continuous tone images can be reproduced by a thermal sublimation process in which a sublimable ink is vaporized and transferred to a recording medium, in a quantity depending on the intensity of heat generated by a thermal head. The temperature of the thermal head can be varied by an electric current supplied to the thermal head, thus controlling the amount of ink to be vaporized. The process lends itself to the conversion of image densities into a multiplicity of tones. The thermal sublimation process requires that the recording medium be even and uniform on its surface. Therefore, the process usually employs a dedicated recording medium in the form of a sheet of paper coated with a polyester, and hence requires the expenditure of a high running cost.

Any of the recording methods referred to above is a thermal recording process, and needs to incorporate a heat dissipation device in recording equipment. The equipment which operates according to these methods is not small and light, and also not portable.

Another recording process known in the art is a laser beam scanning process. However, laser beam scanning recording devices are large because of the scanning of a recording medium with a laser beam. The laser beam scanning recording devices are also expensive since the light deflector for deflecting the laser beam is expensive.

Still another recording arrangement employs a piezoelectric device for atomizing and ejecting a liquid ink through nozzles. The recording system has a relatively low recording speed since it uses four nozzles for printing an image in a serial fashion. It is a big disadvantage of this recording system that these ink ejecting nozzles are often plugged. It is highly difficult to keep the nozzles in good operating conditions.

SUMMARY OF THE INVENTION

It is a principal object of the present invention to provide a video image printer which drives a liquid crystal light valve based on image information borne by an input video signal, to allow light to be transmitted through the light valve for exposure of a self-processing film of a silver-salt photosensitive material, known as an instantaneous photographic film, to reproduce a high-quality colored image thereon, the video image printer being small and lightweight.

Another object of the present invention is to provide a video image printer comprising a liquid crystal light valve with a liquid crystal orientation thereof variable depending on an applied video signal, color filter means mounted on one end of the liquid crystal light valve, a light source optically coupled to the one end of the liquid crystal light valve, a film disposed on the side of an opposite end of the liquid crystal light valve and carrying a self-processing solution, the film being selectively exposable to an image that is formed by light from the light source through the color filter means and the liquid crystal light valve controlled by the applied video signal, and means for spreading the processing solution over the film which has been exposed.

Still another object of the present invention is to provide the video image printer wherein the spreading means comprises a pair of squeezing rollers for sandwiching and pressing the film therebetween.

Yet another object of the present invention is to provide the video image printer further comprising a graded-index lens array disposed between the film and the opposite end of the liquid crystal light valve.

Yet still another object of the present invention is to provide the video image printer wherein the liquid crystal light valve includes a twisted nematic liquid crystal.

A further object of the present invention is to provide the video image printer wherein the liquid crystal light valve includes a ferroelectric smectic liquid crystal with a helix axis thereof extending along the normal direction of smectic layers of the liquid crystal.

A still further object of the present invention is to provide the video image printer further including means for feeding the film in an auxiliary scanning direction while the film is being scanned in a main scanning direction perpendicular to the auxiliary scanning direction so as to be exposed to the image, wherein the color filter means comprises three linear color filters extending parallel to the main scanning direction, the liquid crystal light valve comprising a matrix of pixel electrodes arranged in arrays corresponding respectively to the color filters.

A yet still further object of the present invention is to provide the video image printer further including means for feeding the film in an auxiliary scanning direction while the film is being scanned in a main scanning direction perpendicular to the auxiliary scanning direction so as to be exposed to the image, wherein the color filter means comprises three linear color filters extending parallel to the main scanning direction, the liquid crystal light valve comprising a plurality of pixel electrodes arranged in arrays corresponding respectively to the color filters, the pixel electrodes being staggered in the auxiliary scanning direction.

Still another object of the present invention is to provide the video image printer wherein the color filter means comprises a mosaic pattern of color filters of R, G, B.

Still another object of the present invention is to provide the video image printer further including means for feeding the film in an auxiliary scanning direction while the film is being scanned in a main scanning direction perpendicular to the auxiliary scanning direction so as to be exposed to the image, wherein the color filter means comprises a plurality of color filters of R, G, B, the color filters being arranged in parallel stripes extending in the auxiliary scanning direction.

Yet another object of the present invention is to provide the video image printer wherein the light source comprises a rod-shaped light source.

Yet still another object of the present invention is to provide the video image printer wherein the light source comprises a combination of a point light source and a condenser lens.

A still further object of the present invention is to provide the video image printer wherein the light source comprises an electroluminescent panel.

A yet further object of the present invention is to provide the video image printer wherein the light source comprises a plurality of juxtaposed linear light sources and a diffusion plate for diffusing light emitted from the linear light sources.

A further object of the present invention is to provide the video image printer wherein the light source comprises a transmissive plate with diffusion layers disposed respectively on upper and lower surfaces thereof, a reflecting plate disposed in confronting relation to the transmissive plate, a pair of mirrors of parabolic cross section disposed one on each side of the transmissive plate and the reflecting plate, and a pair of linear light sources disposed respectively at the focal points of the mirrors.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
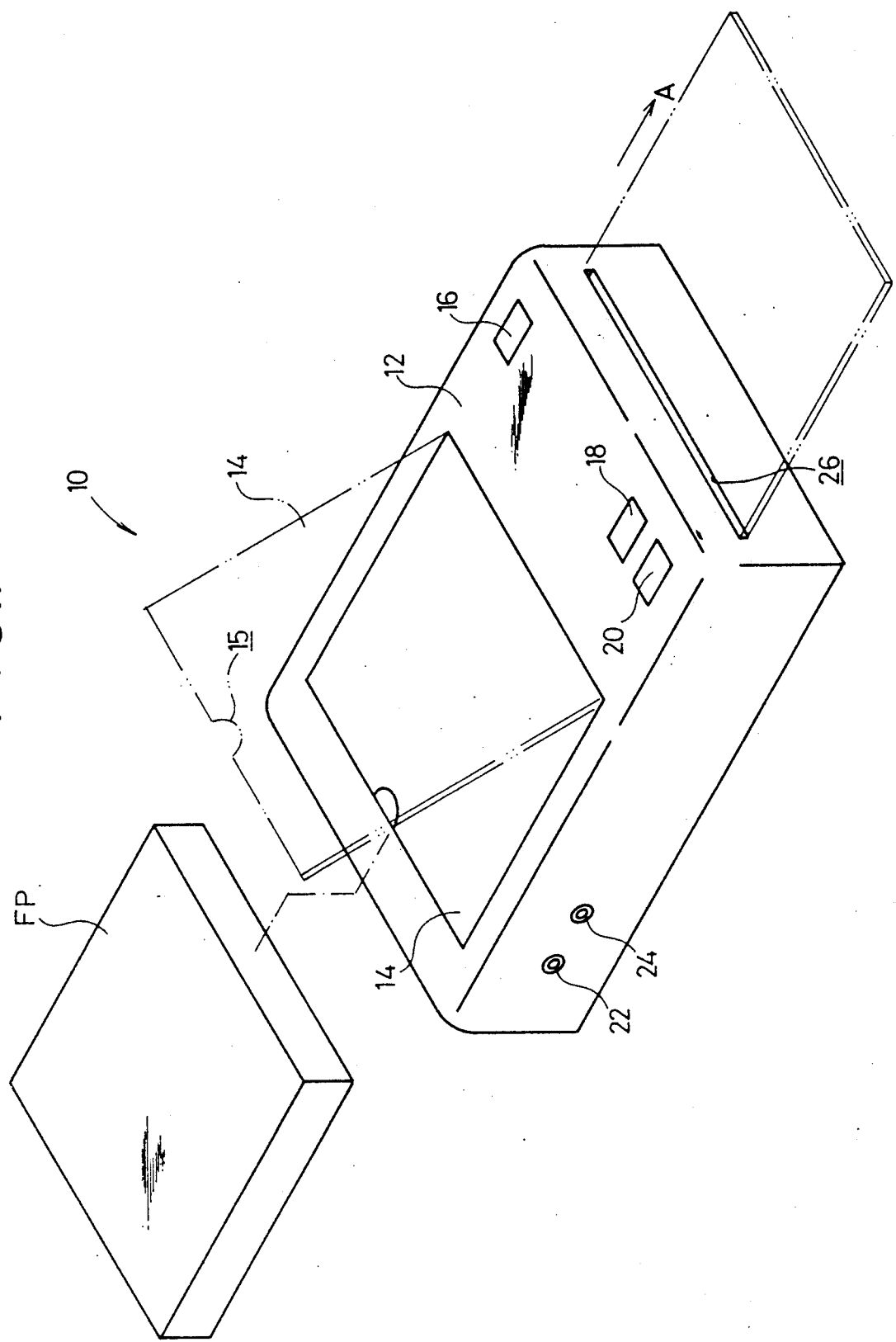
FIG. 1 is a perspective view of a video image printer according to an embodiment of the present invention.

As shown in FIG. 1, a video image printer 10 according to an embodiment of the present invention includes a casing 12 having a lid 14, an on/off switch 16, a memory switch 18, and a print switch 20. The lid 14, on the upper side of the casing 12, is pivotally coupled at one end to the casing 12 and has a semicircular recess 15 defined in the other end. The lid 14 can be opened, i.e., swung away from the casing 12 and closed, i.e., swung toward the casing 12, by the user who grips the lid 14 through the recess 15. The casing 12 also supports on one side panel a power supply input terminal 22 and a video signal input terminal 24. A rectangular slot 26 is horizontally defined in a front side panel of the casing 12. A recorded film F, which is made of a silver-salt photographic material and has self-processing solutions, is withdrawn from the casing 12 through the slot 26.

Figure 2:
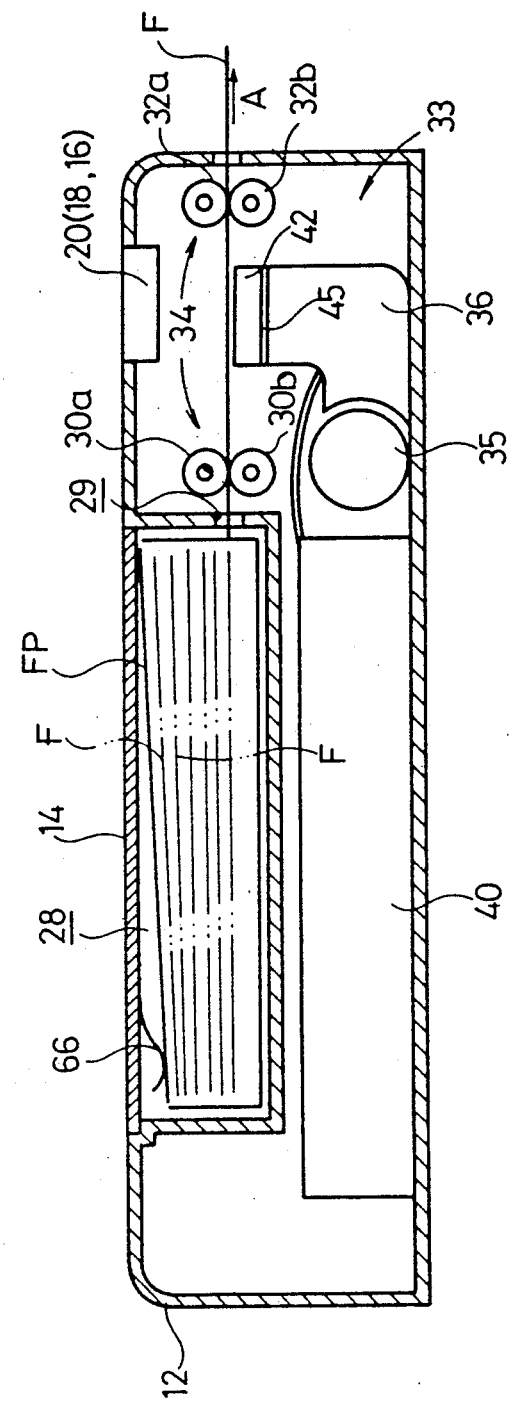
FIG. 2 is a vertical cross-sectional view of the video image printer.
Figure 3:
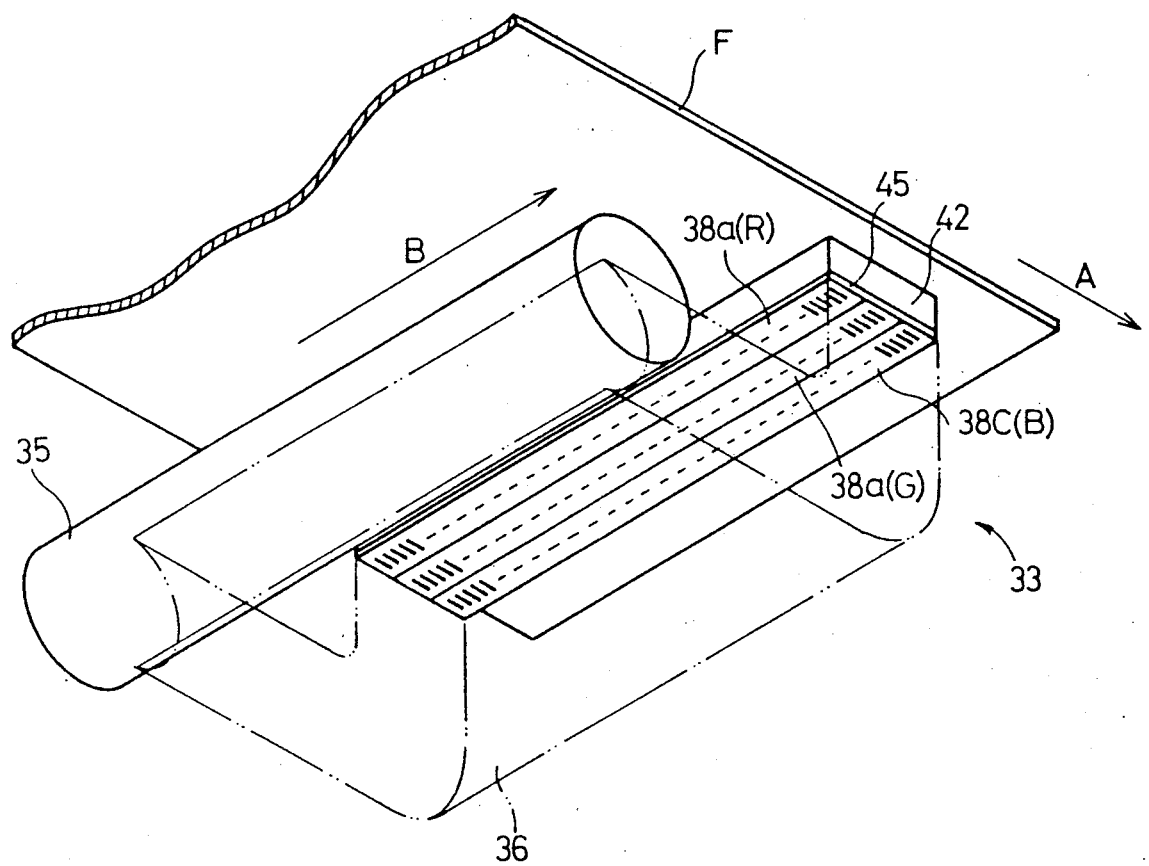
FIG. 3 is an enlarged fragmentary perspective view of an exposure recording unit in the video image printer shown in FIGS. 1 and 2.

As shown in FIG. 2, the casing 12 has a film loading box 28 for storing a film pack FP which contains a stack of self-processing films F. The film loading box 28 has a slot 29 defined in a side panel thereof in substantial horizontal alignment with the slot 26. The casing 12 houses a feed roller assembly 34 which is disposed between the film loading box 28 and the front side panel of the casing 12. The feed roller assembly 34 includes a pair of rim drive rollers 30a, 30b disposed in the casing 12 adjacent to the slot 29, for gripping and drawing one, at a time, of the self-processing films F, and a pair of squeezing rollers 32a, 32b disposed near the slot 26, for developing a recorded image on an exposed film F. An exposure recording unit 33 for exposing the film F to record an image thereon is also housed in the casing 12 and positioned in a position between the rim driver roller pair and the squeezing roller pair. As shown in FIG. 3, the exposure recording unit 33 comprises a rod-shaped light source 35 comprising a halogen lamp or the like, an optical fiber bundle 36 for guiding light from the light source 35, three color filters 38a through 38c of red (R), green (G), and blue (B) disposed on the upper end of the optical fiber bundle 36 and extending parallel to the auxiliary scanning direction indicated by the arrow A which is perpendicular to the main scanning direction indicated by the arrow B, a liquid crystal light valve 45 disposed on the color filters 38a through 38c, and a graded-index lens array 42 disposed on the liquid crystal light valve 45. While the film M is moving on and across the graded-index lens array 42, the film M is exposed to light which is emitted from the light source 35 and passes through the optical fiber bundle 36, the color filters 38a through 38c, the liquid crystal light valve 45, and the graded-index lens array 42.

Figure 4:
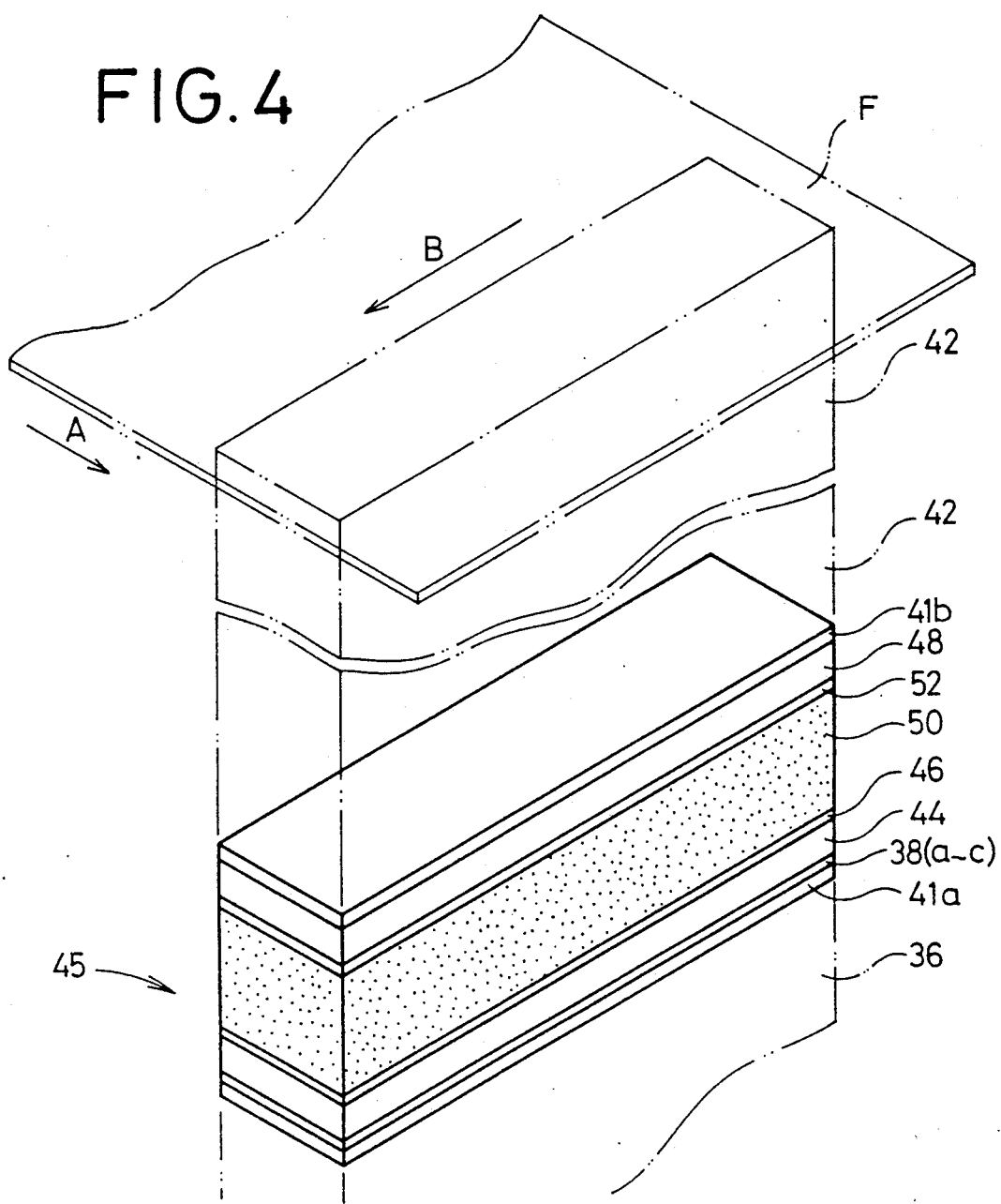
FIG. 4 is a fragmentary perspective view of a liquid crystal light valve having color filters in the video image printer.

FIG. 4 shows the liquid crystal light valve 45 in detail, with the color filters 38a through 38c combined therewith. The liquid crystal light valve 45 includes polarizers 41a, 41b disposed respectively on lower and upper sides of the liquid crystal light valve 45, the polarizers 41a, 41b having parallel polarizing directions, respectively. A first glass substrate 44 is positioned inwardly of the polarizer 41a, which is disposed on the upper exit end of the optical fiber bundle 36. The color filters 38a through 38c, in the form of films colored by dyes of three colors R, G, B and deposited thereon by vacuum evaporation, are disposed on one surface of the first glass substrate 44 which faces the polarizer 41a. Instead of forming thin films as the color filters 38a through 38c on the first glass substrate 44 by vacuum evaporation, layers of gelatin or resin colored by dyes, or layers of resin with pigments dispersed therein may be coated on one surface of the first glass substrate 44. Transparent electrodes, i.e., pixel electrodes 46 are arranged in linear arrays extending in the main scanning direction indicated by the arrow B (see FIG. 5) along the color filters 38a through 38c.

A second glass substrate 48 is positioned inwardly of the polarizer 41b. Between the pixel electrodes 46 and the second glass substrate 48, there is sealed a liquid crystal 50 such as a twisted nematic liquid crystal or the like. A common transparent electrode 52 is deposited between the second glass substrate 48 and the liquid crystal 50, the common electrode 52 being deposited on one surface of the second glass substrate 48 by vacuum evaporation. The polarizer 41b is disposed on the opposite surface of the second glass substrate 48. Light that has passed through the polarizer 41b is applied through the graded-index lens array 42 to the film F for exposure thereof.

The graded-index lens array 42 comprises an array of cylindrical lenses each having a radial graded index profile, the cylindrical lenses being vertically aligned with the pixel electrodes 46. The graded-index lens array 42 is effective in reducing the distance between the film F and the liquid crystal light valve 45.

Figure 6:
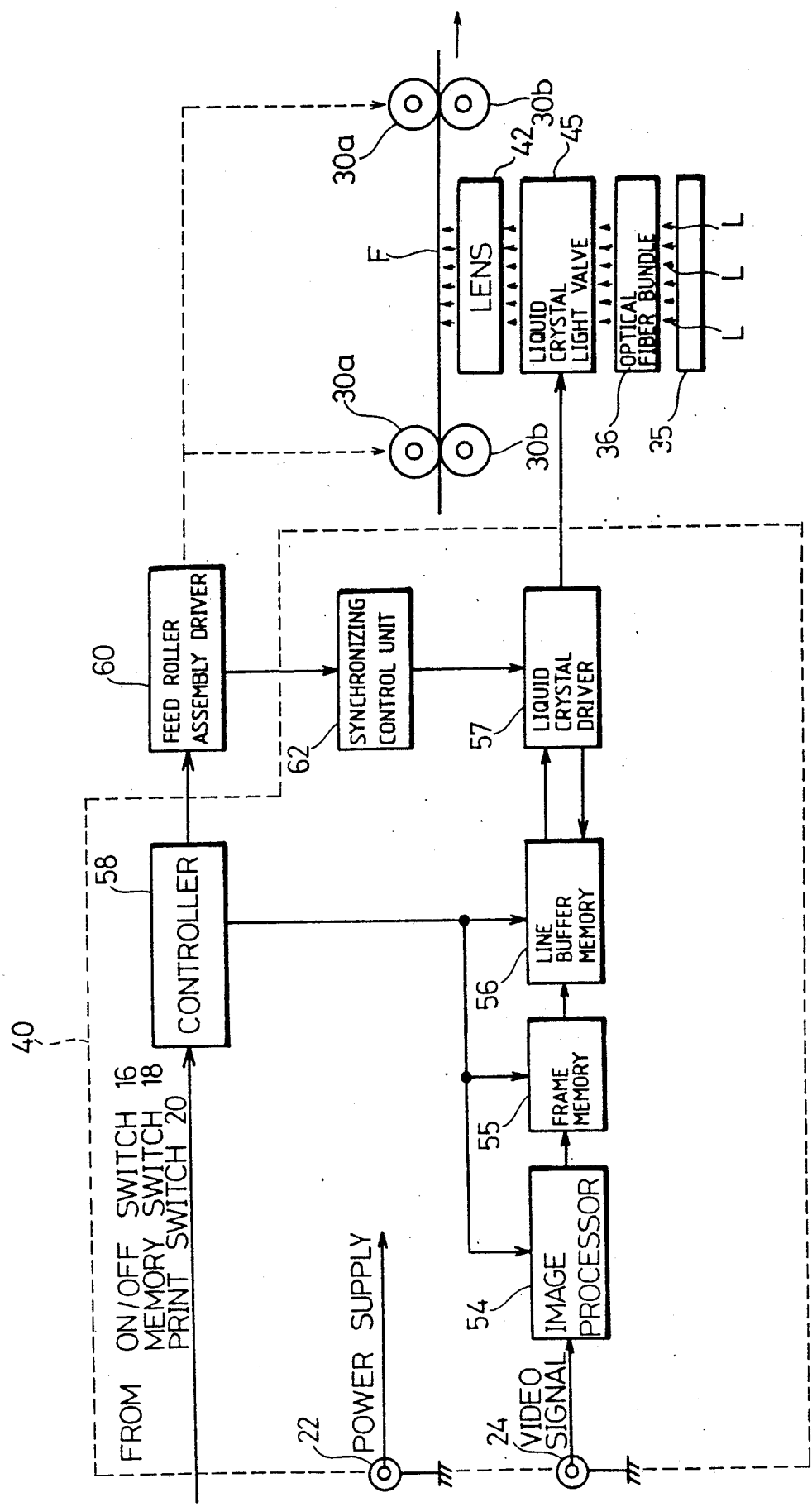
FIG. 6 is a block diagram of an electric circuit incorporated in the video image printer.

The video image printer 10 of the above construction incorporates an electric circuit 40 shown in FIG. 6. The electric circuit 40 comprises an image processor 54 for processing a video signal which is applied from the video signal input terminal 24, a frame memory 55 for storing an output signal from the image processor 54, a line buffer memory 56 connected to the frame memory 56, a liquid crystal driver 57 for driving the liquid crystal light valve 45 based on one line of an image signal from the line buffer memory 56, a controller 58 for receiving control signals from the on/off switch 16, the memory switch 18, and the print switch 20, a feed roller assembly driver 60 for driving the feed roller assembly 34 under the control of the controller 58, and a synchronizing control unit 62 for synchronously controlling the liquid crystal driver 57 based on an output signal from the feed roller assembly driver 60.

The video image printer according to the present invention is basically constructed as described above. Operation and advantages of the video image printer will now be described below.

The video image printer 10 is connected through the video image input terminal 24 to a video signal source (not shown) such as a video camera, an electronic still camera, a video tape recorder, a television receiver, or the like. In operation, the video image printer 10 produces a hard copy in the form of a film F on which image information represented by a video signal from such a video signal source is recorded.

The user first connects the power supply input terminal 22 to an external power supply, and presses the on/off switch 16 to turn on the video image printer 10. Then, the user inserts a finger into the recess 15 and lifts the lid 14, and load a film pack FP containing stacked instantaneous photographic films F into the film loading box 28. The loaded film pack FP is securely held down by a spring 66 (see FIG. 2) on the back of the lid 14.

If the user wants to have a hard copy of an image which is being displayed on a monitor display coupled to the video signal source, the user presses the print switch 20. In response to a control signal from the print switch 20, the controller 58 energizes the feed roller assembly driver 60 to drive the rim driver rollers 30a, 30b for withdrawing one film F from the film pack FP and positioning the film F in confronting relation to the graded-index lens array 42 on the upper end of the liquid crystal light valve 45. The video signal transmitted from the monitor display is converted into image density information and color or RGB information, for each of the pixels of the liquid crystal light valve 45, i.e., the pixel electrodes 46, by the image processor 54. One frame, at a time, of such image density information and RGB information is stored in the frame memory 55. The stored image density information and RGB information are then stored, one scanning line at a time, in the line buffer memory 56.

Positional information about the film F which is fed in the auxiliary scanning direction A is sent from the feed roller assembly driver 60 to the synchronizing control unit 62. The liquid crystal driver 57 is of a known arrangement for successively scanning and driving the liquid crystal light valve 45 by application of a voltage to the pixel electrodes 46 successively in the main scanning direction indicated by the arrow B (FIGS. 3 and 5) according to certain timing. More specifically, the liquid crystal driver 57 reads the stored image density information and RGB information corresponding to a selected pixel electrode 46 in response to a timing signal from the synchronizing control unit 62, and applies a voltage to the selected pixel electrode 46 based on the image density information and RGB information thus read. In this manner, the pixels corresponding to the selected pixel electrodes 46 can be set to desired degrees of lightness. For example, when no voltage is applied to the liquid crystal 50, light L emitted from the light source 35 passes through the optical fiber bundle 36, the polarizer 41a, and any one of the color filters 38a through 38c. Since the polarizing direction of the light L is turned 90° by the liquid crystal 50, the light L is blocked by and cannot go through the polarizer 41b. When a voltage higher than a predetermined threshold level is applied to the liquid crystal 50, the orientation of the liquid crystal 50 is varied, i.e., the polarizing direction of the light L is not twisted 90° thereby, and the light L is allowed to pass through the polarizer 41b and the graded-index lens array 42 to the film F. Therefore, the film F is exposed to a transmitted image which is composed of pixels having respective hues and brightnesses which are controlled by the liquid crystal light valve 45.

The film F is exposed successively line by line, and is introduced between the squeezing rollers 32a, 32b in synchronism with the exposure of the film F. The squeezing rollers 32a, 32b, serving as a means for spreading processing solutions, sandwich and press the film F therebetween, while at the same time feeding the film F in the auxiliary scanning direction A. During this time, the processing solutions which are carried by the self-processing film F are spread over and coated on the film F, thereby developing the recorded image into a visible image. In this manner, the film M carrying the image corresponding to the video signal is discharged as a hard copy from the video image printer 10.

When the memory switch 18 is pressed, the image signal corresponding to the applied video signal is stored for one frame in the frame memory 64.

In the illustrated embodiment, the liquid crystal 50 of the liquid crystal light valve 45 comprises a twisted nematic liquid crystal. However, the liquid crystal 50 may be a ferroelectric smectic liquid crystal in which molecules are arranged in layers, with the helix axis extending along the normal direction of the layers of the liquid crystal. The ferroelectric liquid crystal is quicker in response than the nematic liquid crystal, can control the intensity of light in an increased range through pulse number modulation because of the quick response. Therefore, a video image printer employing the ferroelectric smectic liquid crystal can produce images in a wide range of tones.

Figure 7:
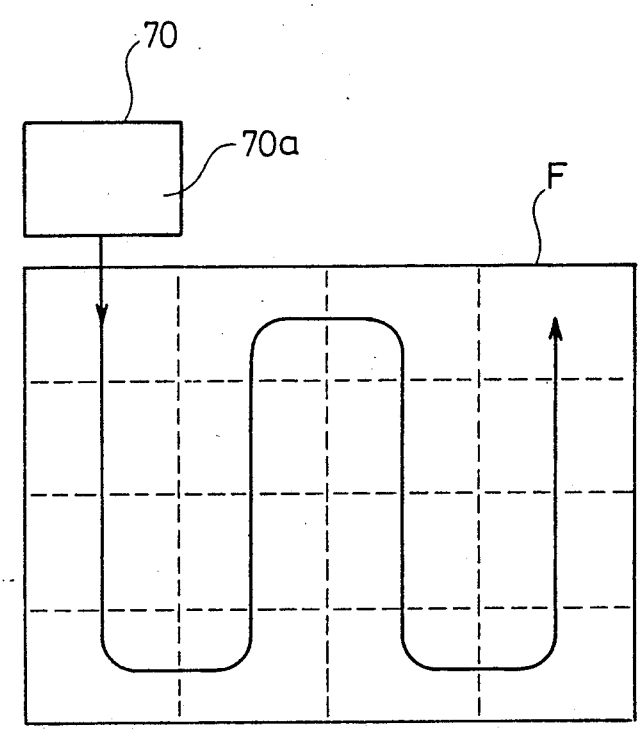
FIG. 7 is a view showing the relationship between a liquid crystal light valve and a film in a video image printer according to another embodiment of the present invention.

In the illustrated video image printer, the film F is fed while it is being exposed. FIG. 7 shows a video image printer according to another embodiment of the present invention. The video image printer includes a liquid crystal light valve 70 having an image forming area 70a the size of which is equal to the size of a liquid crystal display for use on a 1-inch viewfinder or a 2- or 3-inch television receiver. In operation, the liquid crystal light valve 70 is moved along the surface of the film F, e.g., in the direction indicated by the arrow to form an image all over the film F.

Figure 5:
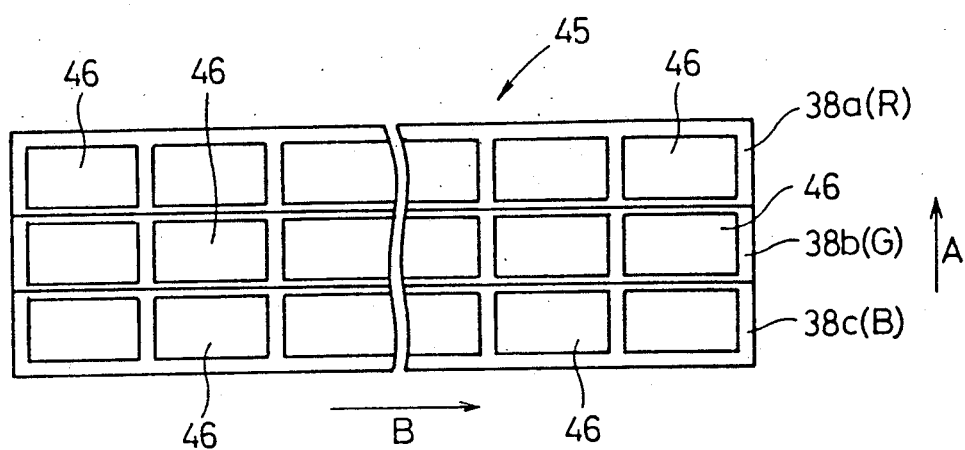
FIG. 5 is a view showing the relationship between the color filters and pixel electrodes of the liquid crystal light valve.
Figure 8:
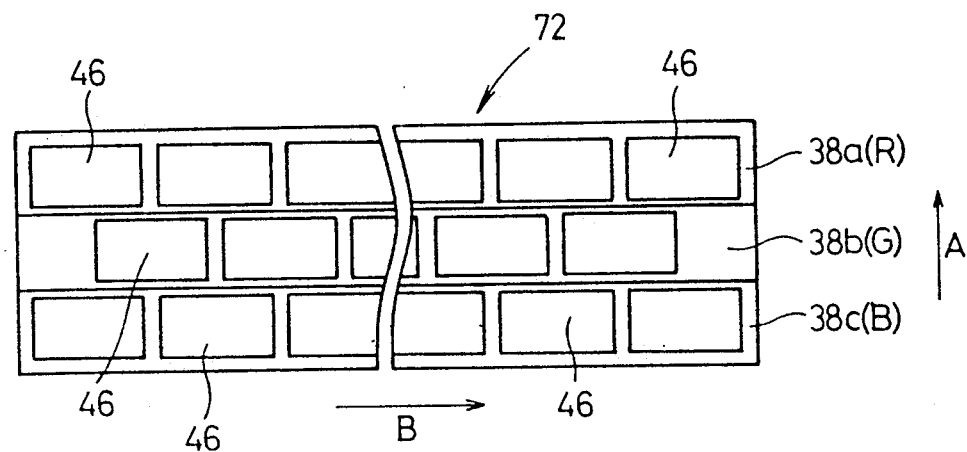
FIGS. 8 through 10 are views showing the relationship between color filters and pixel electrodes of liquid crystal light valves in video image printers according to other embodiments of the present invention.

In the illustrated embodiment, as shown in FIG. 5, the path of light from the single light source is divided into three paths corresponding to three parallel color filters 38a through 38c that extend in the main scanning direction B, and the pixel electrodes 46 which are arranged in arrays aligned with the color filters 38a through 38c are also arrayed in the auxiliary scanning direction A. As shown in FIG. 8, the pixel electrodes 46 may be staggered or zigzagged the auxiliary scanning direction A, rather than being arranged in the matrix pattern. Three light sources may be employed so that they correspond respectively to the color filters 38a through 38c.

Figure 9:
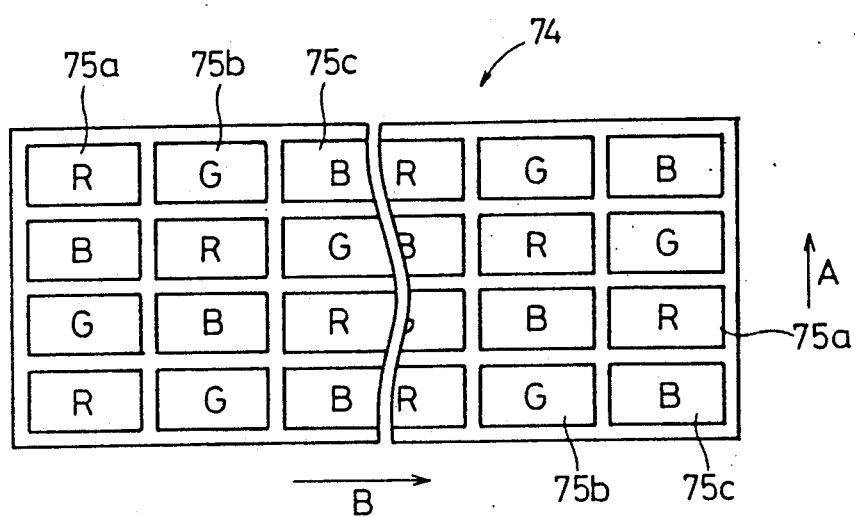
Figure 10:
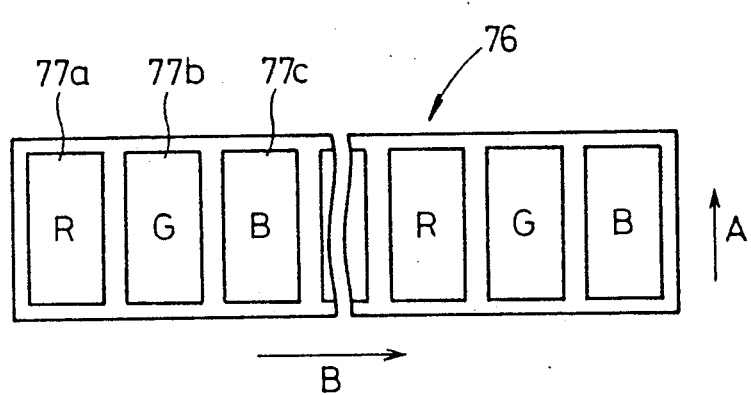

The color filters and the pixel electrodes in the liquid crystal light valve are not limited to the linear arrangement. FIG. 9 shows a liquid crystal light valve 74 including R, G, B color filters 75a through 75c which are arranged in a mosaic pattern. FIG. 10 illustrates another liquid crystal light valve 76 including pixel electrodes and color filters 77a through 77c which are in the shape of parallel stripes extending in the auxiliary scanning direction A.

Figure 11:
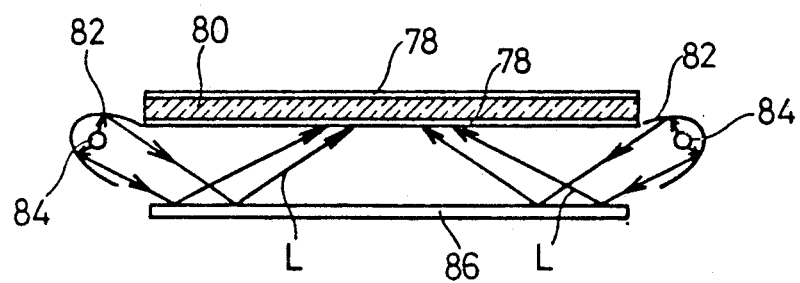
FIG. 11 is a schematic side elevational view of a light source in a video image printer according to still another embodiment of the present invention.

The light source for emitting light may be a combination of a point light source and a condenser lens, or an electroluminescent panel, or a plurality of juxtaposed linear light sources and a diffusion plate for diffusing light emitted from the linear light sources. FIG. 11 shows a light source according to still another embodiment of the present invention. As shown in FIG. 11, two diffusion layers 78 are attached to upper and lower surfaces, respectively, of a flat transmissive plate 80, and two elongate mirrors 82 of parabolic cross section are disposed one on each side of the flat plate 80. Linear light sources 84 are positioned at the focal points, respectively, of the mirrors 82, and extend along the mirrors 82. A reflecting plate 86 is disposed below the flat transmissive plate 80 in confronting relation thereto. Light L emitted from the linear light sources 84 is reflected by the mirrors 82 and the reflecting plate 86 so as to pass through the flat transmissive plate 80, so that the light of uniform illuminance will be applied to the liquid crystal light valve.

The R, G, B color filters are incorporated in the liquid crystal light valve in the illustrated embodiment. However, the liquid crystal light valve and the R, G, B color filters may be separate from each other, and the R, G, B color filters may be disposed between the light source and the liquid crystal light valve and extend perpendicularly to the axis of light emitted from the light source. In operation, the color filters are rotated and the film F is exposed to a colored image passing through the color filters.

With the present invention, as described above, the self-processing film coated with a silver-salt photosensitive material is exposed to light which is transmitted through the color filters and the liquid crystal light valve that is controlled according to an input video signal. Since the silver-salt photosensitive material is used on the film, images reproduced thereon are very high in quality. Use of the self-processing film shortens the time required to obtain a desired hard copy. The liquid crystal light valve is effective in producing images in a wide range of tones. The video image printer of the invention is also small in size since it does not employ any thermal head or any laser scanning optical system.

Although certain preferred embodiments have been shown and described, it should be understood that many changes and modifications may be made therein without departing from the scope of the appended claims.

What is claimed is:

1. A video image printer comprising:
   a liquid crystal light valve with a liquid crystal orientation thereof variable depending on an applied video signal;
   color filter means mounted on one end of said liquid crystal light valve;
   a light source optically coupled to said one end of said liquid crystal light valve;
   a film disposed on the side of an opposite end of said liquid crystal light valve and carrying a self-processing solution, said film being selectively exposable to an image that is formed by light from said light source through said color filter means and said liquid crystal light valve controlled by the applied video signal;
   means for spreading the processing solution over the film which has been exposed; and,
   means for feeding said film in an auxiliary scanning direction while said film is being scanned in a main scanning direction transverse to said auxiliary scanning direction so as to be exposed to the image.

2. A video image printer according to claim 1, wherein said spreading means comprises a pair of squeezing rollers for sandwiching and pressing the film therebetween.

3. A video image printer according to claim 1, further comprising a graded-index lens array disposed between said film and said opposite end of the liquid crystal light valve.

4. A video image printer according to claim 1, wherein said liquid crystal light valve includes a twisted nematic liquid crystal.

5. A video image printer according to claim 1, wherein said liquid crystal light valve includes a ferroelectric smectic liquid crystal with a helix axis thereof extending along the normal direction of smectic layers of the liquid crystal.

6. A video image printer comprising:
a liquid crystal light valve with a liquid crystal orientation thereof variable depending on an applied video signal;
color filter means mounted on one end of said liquid crystal light valve;
a light source optically coupled to said one end of said liquid crystal light valve;
a film disposed on the side of an opposite end of said liquid crystal light valve and carrying a self-processing solution, said film being selectively exposable to an image that is formed by light from said light source through said color filter means and said liquid crystal light valve controlled by the applied video signal;
means for spreading the processing solution over the film which has been exposed; and,
means for feeding said film in an auxiliary scanning direction while said film is being scanned in a main scanning direction perpendicular to said auxiliary scanning direction so as to be exposed to the image, wherein said color filter means comprises three linear color filters extending parallel to said main scanning direction, said liquid crystal light valve comprising a matrix of pixel electrodes arranged in arrays corresponding respectively to said color filters.

7. A video image printer comprising:
a liquid crystal light valve with a liquid crystal orientation thereof variable depending on an applied video signal;
color filter means mounted on one end of said liquid crystal light valve;
a light source optically coupled to said one end of said liquid crystal light valve;
a film disposed on the side of an opposite end of said liquid crystal light valve and carrying a self-processing solution, said film being selectively exposable to an image that is formed by light from said light source through said color filter means and said liquid crystal light valve controlled by the applied video signal;
means for spreading the processing solution over the film which has been exposed; and,
means for feeding said film in an auxiliary scanning direction while said film is being scanned in a main scanning direction perpendicular to said auxiliary scanning direction so as to be exposed to the image, wherein said color filter means comprises three linear color filters extending parallel to said main scanning direction, said liquid crystal light valve comprising a plurality of pixel electrodes arranged in arrays corresponding respectively to said color filters, said pixel electrodes being staggered in said auxiliary scanning direction.

8. A video image printer according to claim 1, wherein said color filter means comprises a mosaic pattern of color filters of R, G, B.

9. A video image printer comprising:
a liquid crystal light valve with a liquid crystal orientation thereof variable depending on an applied video signal;
color filter means mounted on one end of said liquid crystal light valve;
a light source optically coupled to said one end of said liquid crystal light valve;
a film disposed on the side of an opposite end of said liquid crystal light valve and carrying a self-processing solution, said film being selectively exposable to an image that is formed by light from said light source through said color filter means and said liquid crystal light valve controlled by the applied video signal;
means for spreading the processing solution over the film which has been exposed; and,
means for feeding said film in an auxiliary scanning direction while said film is being scanned in a main scanning direction perpendicular to said auxiliary scanning direction so as to be exposed to the image, wherein said color filter means comprises a plurality of color filters of R, G, B, said color filters being arranged in parallel stripes extending in said auxiliary scanning direction.

10. A video image printer according to claim 1, wherein said light source comprises a rod-shaped light source.

11. A video image printer according to claim 1, wherein said light source comprises a combination of a point light source and a condenser lens.

12. A video image printer according to claim 1, wherein said light source comprises an electroluminescent panel.

13. A video image printer according to claim 1, wherein said light source comprises a plurality of juxtaposed linear light sources and a diffusion plate for diffusing light emitted from said linear light sources.

14. A video image printer comprising:
a liquid crystal light valve with a liquid crystal orientation thereof variable depending on an applied video signal;
color filter means mounted on one end of said liquid crystal light valve;
a light source optically coupled to said one end of said liquid crystal light valve;
a film disposed on the side of an opposite end of said liquid crystal light valve and carrying a self-processing solution, said film being selectively exposable to an image that is formed by light from said light source through said color filter means and said liquid crystal light valve controlled by the applied video signal; and,
means for spreading the processing solution over the film which has been exposed;
wherein said light source comprises a transmissive plate with diffusion layers disposed respectively on upper and lower surfaces thereof, a reflecting plate disposed in confronting relation to said transmissive plate, a pair of mirrors of parabolic cross section disposed one on each side of said transmissive plate and said reflecting plate, and a pair of linear light sources disposed respectively at the focal points of said mirrors.

* * * * *